(12) United States Patent
Gould et al.

(10) Patent No.: US 6,553,106 B1
(45) Date of Patent: Apr. 22, 2003

(54) ALPHANUMERIC MESSAGING SYSTEM

(75) Inventors: Kevin W. Gould, Tinton Falls, NJ (US); Gary L. Griffith, Arvada, CO (US); Majid Ressalei, Eatontown, NJ (US); Wilfred E. Lehder, Rumson, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/472,690

(22) Filed: Dec. 27, 1999

(51) Int. Cl.[7] .............................................. H04M 11/00
(52) U.S. Cl. ................... 379/93.17; 379/93.14
(58) Field of Search .............................. 379/37, 38, 39, 379/40, 106.02, 93.17, 93.27, 93.18, 93.01, 93.09, 93.23; 340/539, 540, 531, 533

(56) References Cited

U.S. PATENT DOCUMENTS

| 4,887,291 A | * | 12/1989 | Stillwell ..................... 379/39 |
| 5,942,986 A | * | 8/1999 | Shabot et al. ................. 379/38 |
| 6,031,455 A | * | 2/2000 | Grube et al. ................ 340/539 |
| 6,201,856 B1 | * | 3/2001 | Orwick et al. ................ 379/40 |
| 6,287,252 B1 | * | 9/2001 | Lugo ......................... 600/300 |

* cited by examiner

Primary Examiner—Stella Woo
(74) Attorney, Agent, or Firm—Patton Boggs LLP

(57) ABSTRACT

An alphanumeric messaging system for exchanging alphanumeric messages over a communications connection. The alphanumeric messaging system comprises a communications circuitry, an alphanumeric telephone, and a switching system. The communications circuitry is configured to originate a communications connection in response to receiving a stimulus and exchange alphanumeric messages over the communications connection. The alphanumeric telephone configured to originate a call connection and exchange the alphanumeric messages over the call connection. The switching system is configured to establish the communications connection and the call connection and exchange the alphanumeric messages for the alphanumeric telephone and the communications circuitry.

12 Claims, 7 Drawing Sheets

ALPHANUMERIC MESSAGING SYSTEM

FIELD OF THE INVENTION

The invention relates to communications systems and in particular, to alphanumeric communications over a switching system.

PROBLEM

A switching system provides communications access to public networks. One example of a switching system is a PBX. PBX's eliminate the requirement to wire communication devices directly to a service provider or to another communications device. Rather, the communications devices such as telephones, computers, and facsimile machines have individual connections to the PBX, which in turn provides access to public networks over one or more high-speed communications links.

It is known to provide alphanumeric messaging over a switching system using special devices or systems such as facsimile machines and email software. It is also known to provide limited alphanumeric messaging over telephones connected to the switching system. For example, during an incoming call an alphanumeric display on the telephone could display the phone number of the calling party, the calling party's name, the calling party's extension, or any combination of these messages. Unfortunately, there is no effective technique for providing alphanumeric communications between telephones or between other devices not specifically designed for alphanumeric communications.

SOLUTION

The present invention advances the art by providing alphanumeric communications over a switching system between telephones and other devices not specifically designed for alphanumeric communications. The present invention comprises a communications circuitry configured to originate a communications connection over the switching system with another device in response to receiving a stimulus, and transmit alphanumeric messages over the communications connection. The another device could be another communications circuitry, a telephone, computer system, or any other device configured to receive and display alphanumeric messages. The communications circuitry can be a stand-alone device or incorporated into any other device including but not limited to, hospital heart monitors, security systems, and fire alarm systems. The stimulus could be a user command entered by a programmed key or a signal generated in response to the occurrence of an event. The communications connection could be a wireless connection or a connection over a wireline.

The present invention also comprises an alphanumeric telephone configured to originate a call connection with another device or another alphanumeric telephone connected to the switching system and exchange alphanumeric messages over the call connection with the another device or alphanumeric telephone. The another device could be the communications circuitry, another telephone, or any device capable of receiving and displaying alphanumeric messages. The alphanumeric telephone includes features such as distinctive alerting for incoming alphanumeric messages, storing of alphanumeric messages, voice call origination from an alphanumeric message, and message receipt confirmation. The call connection could be a wireless connection or a connection over a wireline.

A first advantage of the present invention is the ability to provide alphanumeric communications between telephones connected to a switching system. A second advantage of the present invention is the ability to provide alphanumeric messages over other devices connected to the switching system. For example, the communications circuitry could be incorporated into a heart monitor. Upon detection of an irregular heartbeat, the communications circuitry originates a call connection to a telephone at the nurse's station and transmits an alphanumeric message related to the patient's condition over the call connection to the telephone. In another example, the communications circuitry could be included in a security system. Upon detection of movement by a motion sensor the communications circuitry originates a call connection to a telephone or computer system at the central security office and transmits an alphanumeric message over the call connection to the computer system or telephone.

In the context of the present invention a communications connection could be a physical communications connection such as over a wireline, could be a communications path such as between wireless devices, or could be an association such as the associated ports of a packet connection.

DETAILED DESCRIPTION

Alphanumeric Messaging System

Figure 1:
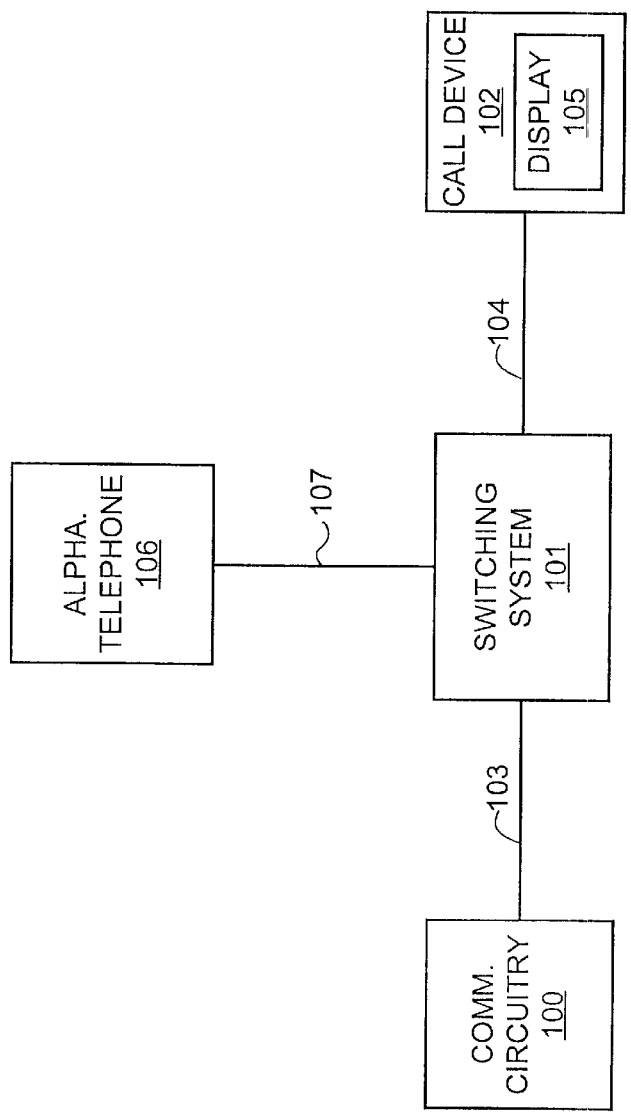
FIG. 1 illustrates an alphanumeric messaging system according to the present invention.

FIG. 1 illustrates an alphanumeric messaging system according to the present invention. FIG. 1 depicts a communications circuitry 100, call device 102, a switching system 101, and an alphanumeric telephone 106. Call device 102 includes alphanumeric display 105.

The communications circuitry 100, the call device 102, and the alphanumeric telephone 106 are connected to the switching system 101 by communications paths 103, 104, and 107 respectively. The switching system 101 could handle numerous other such paths although only communications paths 103, 104, and 107 are shown for clarity. Communications paths 103, 104, and 107 could be conventional wireless communications paths or wireline communications links. Similarly, in some examples, communications path 103 could be a wireless communications path while communications paths, 104 and 107, are wireline communications links. In other examples, communications paths, 104 and 107, could be wireless communications paths while communications path 103 is a wireline communications link. In still yet other examples, communications paths, 107 and 103, could be wireless communications paths while communications path 104 is a wireline communications link.

The call device 102 could be any device configured to receive alphanumeric messages and display the alphanumeric messages on display 105. Some examples of the call device 102 include without limitation, a conventional telephone, a computer system, and video equipment. The communications circuitry 100 could be any circuitry configured to originate a communications connection with the call device 102 in response to receiving a stimulus, and transmit alphanumeric messages over the communications connection to the call device 102. The communications connection could be any communications connection capable of carrying alphanumeric messages. The alphanumeric telephone 106 could be any telephone configured to originate a call connection to the call device 102 and exchange alphanumeric messages over the call connection with the call device 102. Switching system 101 could be any switching system capable of establishing the communications connection and the call connection and exchange the alphanumeric messages over the communications connection and the call connection.

Figure 2:
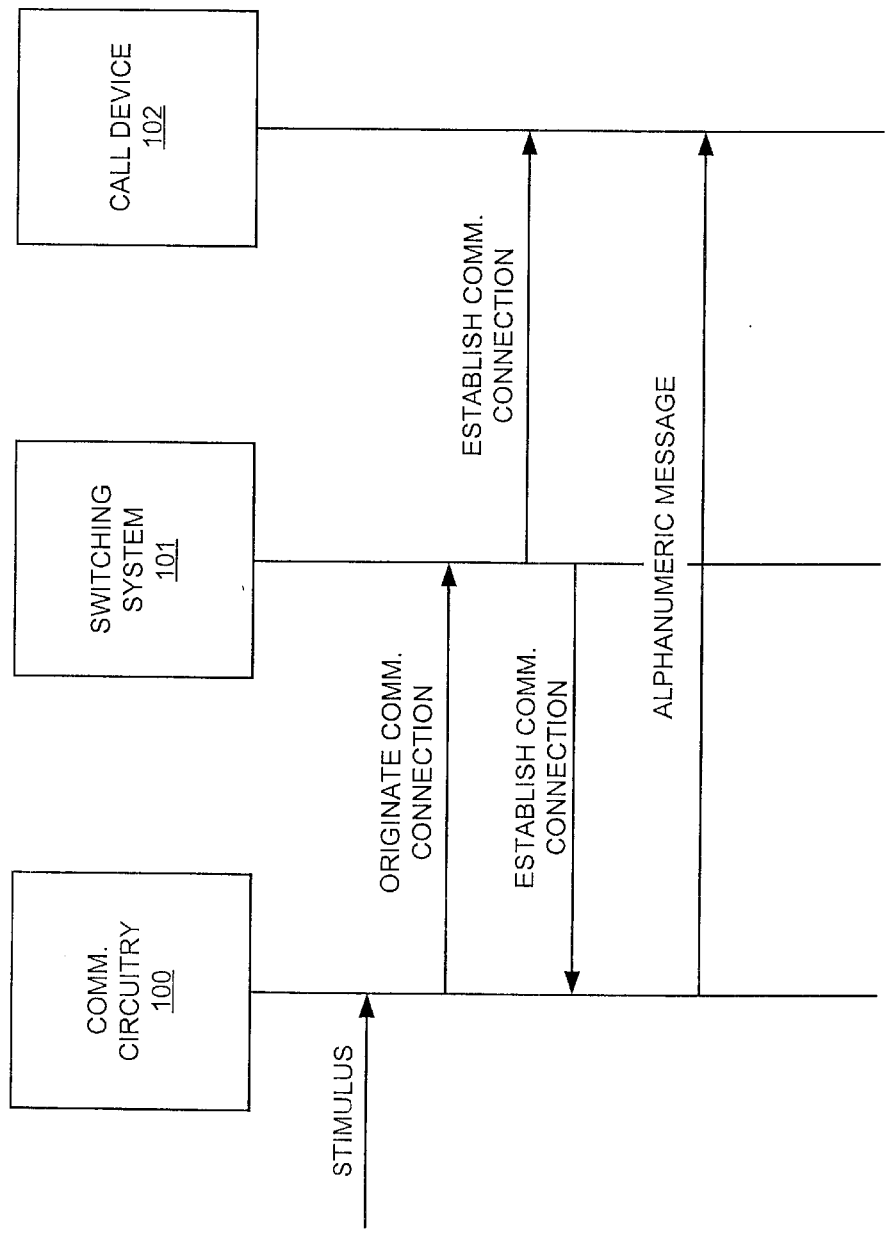
FIG. 2 is a message sequence chart illustrating the operation of a communications circuitry according to the present invention.

FIG. 2 is a message sequence chart illustrating the operation of communications circuitry 100 according to the present invention. On FIG. 2 a stimulus is received. by communications circuitry 100. The stimulus could be an event that communications circuitry is programmed to respond to. The stimulus could also be a command entered by a user. Responsive to receiving the stimulus, communications circuitry 100 originates a communications connection with switching system 101. Switching system 101 responsive to receiving the origination message establishes a communications connection between communications circuitry 100 and call device 102. The communications connection could be a voice call connection, data call connection, or other connection capable of carrying an alphanumeric message. The communications connection could also be a wireless communications connection or a communications connection over a wireline, or a combination of wireless and wireline connections.

In response to connection setup, communications circuitry 100 transmits an alphanumeric message over the communications connection to call device 102. Call device 102 receives the alphanumeric message and displays the message on display 105.

Figure 3:
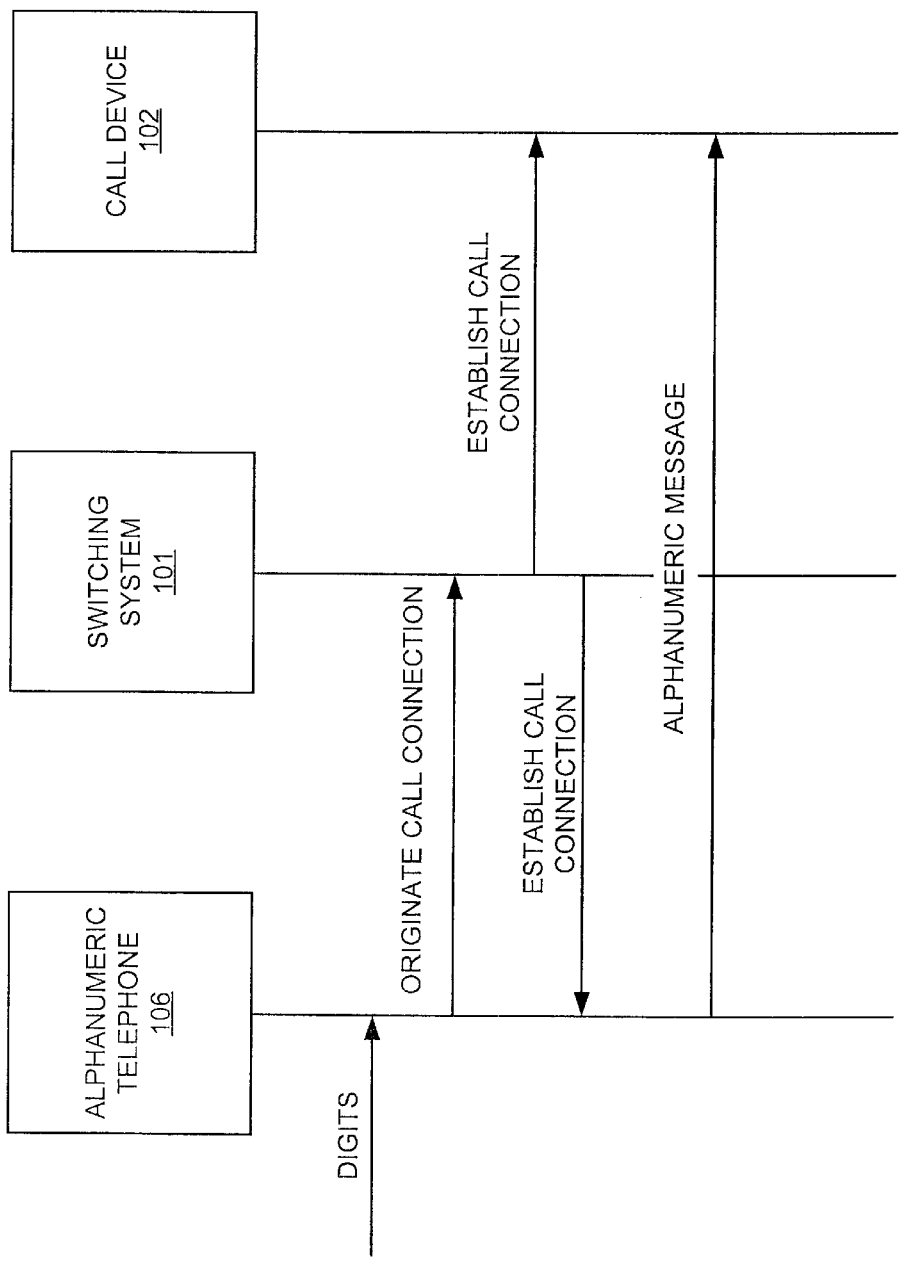
FIG. 3 is a message sequence chart illustrating the operation of an alphanumeric telephone according to the present invention.

FIG. 3 is a message sequence chart illustrating the operation of alphanumeric telephone 106 according to the present invention. On FIG. 3 a user enters digits into alphanumeric telephone 106 to originate a call connection to call device 102. Responsive to receiving the digits, switching system 101 establishes a call connection between alphanumeric telephone 106 and call device 102. The call connection could be a voice call connection, data call connection, or voice-band data call connection. The communications connection could also be a wireless communications connection or a communications connection over a wireline, or a combination of wireless and wireline connections. In response to connection setup, alphanumeric telephone 106 transmits an alphanumeric message over the communications connection to call device 102. Call device 102 receives the alphanumeric message and displays the message on display 105.

Figure 4:
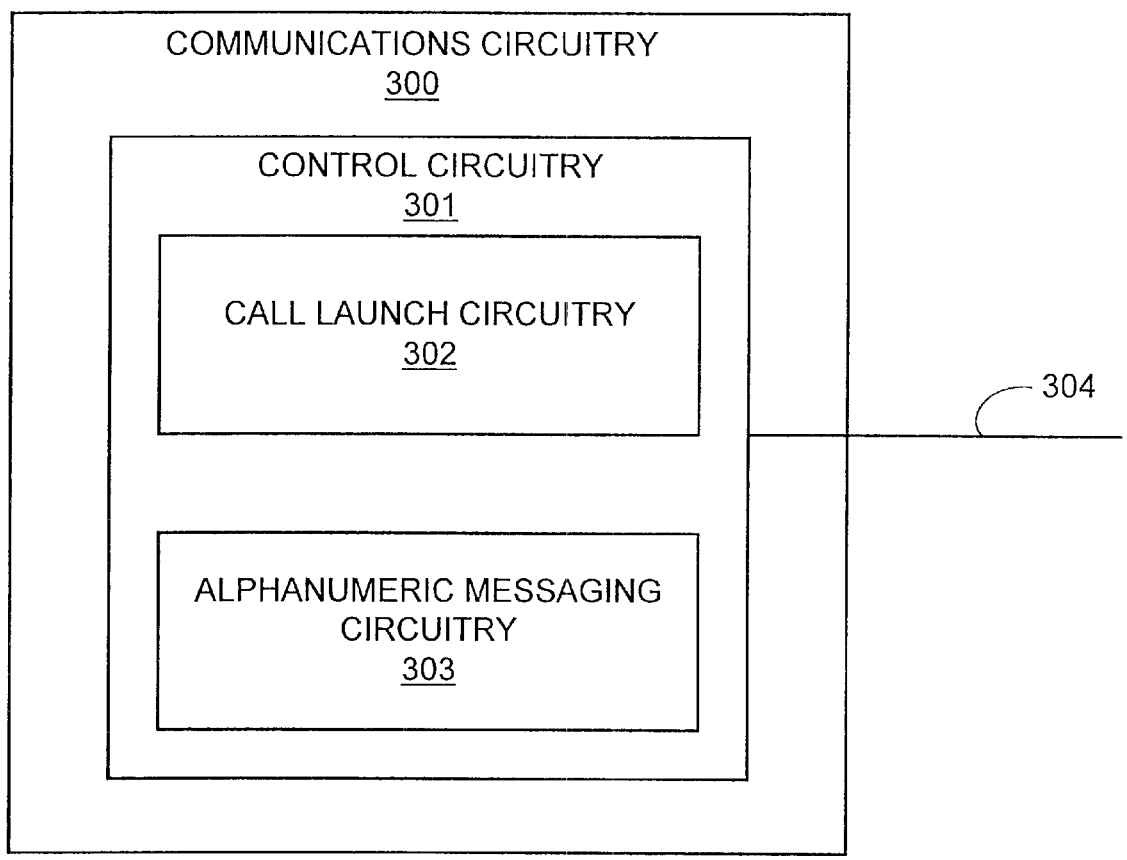
FIG. 4 illustrates an example of a communications circuitry according to the present invention.
Figure 5:
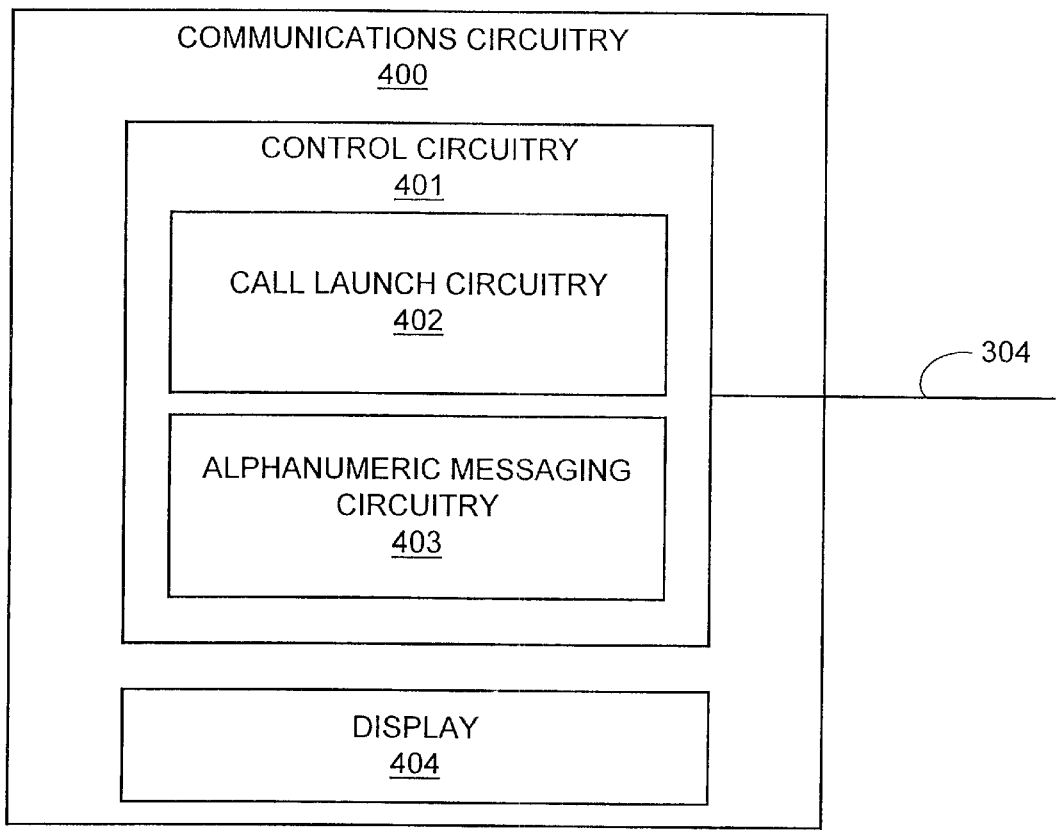
FIG. 5 illustrates another example of a communications circuitry according to the present invention.

Communications Circuitry—FIGS. 4–5

FIGS. 4 and 5 depict examples of a communications circuitry according to the present invention, but those skilled in the art will recognize numerous other configurations that are applicable to the invention described above. Those skilled in the art will also appreciate how combinations of features described below can be combined with the above-described embodiment.

In some embodiments of the communications circuitry according to the present invention, the communications circuitry is configured only to transmit alphanumeric messages over the communications connection to at least one call device. In other embodiments the communications circuitry is configured to exchange alphanumeric messages over the communications connection with the at least one call device.

FIG. 4 depicts an example of a communications circuitry 300 configured only to transmit alphanumeric messages to at least one call device responsive to receiving a stimulus. The communications circuitry 300 is connected to communications path 304 and comprises control circuitry 301, call launch circuitry 302, and alphanumeric messaging circuitry 303.

Communications path 304 is a conventional communications path and could be a wireline communications link or a wireless communications path. In embodiments employing a wireline communications link, some examples of the wireline link include without limitation, twisted pair copper wires, a BRI Integrated Services Digital Network (ISDN) connection, a PRI ISDN connection, a packet connection, an Asynchronous Transfer Mode (ATM) connection, and a Synchronous Optical Network (SONET) connection. In embodiments employing a wireless communications path, some examples of the wireless path include without limitation, analog cellular telephony, digital cellular telephony, global system for mobile communications, and personal communications services using conventional multiplexing schemes. Some examples of multiplexing schemes include without limitation, code division multiple access (CDMA) and time division multiple access (TDMA).

Call launch circuitry 302 could be any circuitry configured to originate the communications connection over communications path 304 with the at least one call device. The communications connection could be a voice telephony call connection, a voice band data call connection, or a data call connection. Alphanumeric messaging circuitry 303 could be any circuitry configured to transmit alphanumeric messages over the communications connection to the at least one call device. Control circuitry 301 could be any circuitry configured to receive the stimulus and control the call launch circuitry 302 to originate the communications connection and to control the alphanumeric messaging circuitry 303 to transmit the alphanumeric messages over the communications connection to the at least one call device.

FIG. 5 depicts an example of a communications circuitry configured to exchange alphanumeric messages with at least one call device, in response to receiving a stimulus. Communications circuitry 400 is connected to communications path 304 and comprises control circuitry 401, call launch circuitry 402, alphanumeric messaging circuitry 403, and display 404.

Call launch circuitry 402 could be any circuitry configured to originate the communications connection over communications path 304 with the at least one call device. Alphanumeric messaging circuitry 403 could be any circuitry configured to exchange alphanumeric messages over the communications connection with the at least one call device. The control circuitry 401 could be any circuitry configured to receive the stimulus, control the call launch circuitry 402 to originate the communications connection, and control the alphanumeric messaging circuitry 403 to transmit alphanumeric messages over the communications connection to the at least one call device. The control circuitry 401 is also configured to receive alphanumeric messages from the at least one call device and control display 404 to display the received alphanumeric messages for a user. Display 404 could be a conventional display configured to display alphanumeric messages.

Those skilled in the art will appreciate that FIGS. 4 and 5 are simplified for clarity, and some conventional components are omitted. Those skilled in the art will also understand that FIGS. 4 and 5 are logical views, and that the control circuitry 301 and 401 are implemented using processors, memory, software, control lines, and other circuitry.

The following are detailed examples to further illustrate the operation of the communications circuitry of the present invention, but those skilled in the art will recognize numerous other examples that are applicable to the invention described above. Those skilled in the art will also appreciate how combinations of features described below can be combined with the above-described embodiments.

In a first example the communications circuitry of the present invention could be incorporated into a patients heart monitor in a hospital setting. The stimulus could be a signal triggered by any number of events, such as the detection of an irregular heartbeat, accelerated heartbeat, or no heartbeat. Responsive to receiving the stimulus the communications circuitry originates a call connection to a telephone at the nurse's station. The communications circuitry transmits an alphanumeric message over the call connection to the telephone at the nurse's station. The alphanumeric message is displayed on the telephone and could include information related to the specific heartbeat condition or be other pertinent patient information.

In another example using the heart monitor scenario described above, the communications circuitry could originate a plurality of call connections to a plurality of telephones at a plurality of locations for a mass messaging event such as a "Code Blue Alert."

In another example of the invention, the communications circuitry could be ncorporated into a security system. The stimulus in this case could be a signal caused by any number of events, including but not limited to, the detection of movement by a motion sensor, or the triggering of a door or window sensor. In response to receiving the stimulus the communications circuitry originates a call connection to a telephone or computer system at the central security office. The communications circuitry transmits an alphanumeric message over the call connection to the computer system or telephone. The alphanumeric message could include information such as the specific device triggered and the location of the specific device triggered.

In another example using the security system scenario described above, the communications circuitry could originate a plurality of call connections to telephones or computer systems at the central security office, the police station, and the building owner's residence. In this case the communications circuitry could transmit the same alphanumeric message to all locations or transmit a specific message to each device. Examples of the different messages could include, a message related to the specific device triggered sent to the security office, the building address sent to the police station, and a message indicating the alarm was triggered sent to the building owner's residence.

In yet another example of the invention, the communications circuitry could be incorporated into a fire alarm system. The stimulus in this case could be the detection of a fire, smoke, or both at a specific location. In response to receiving the stimulus the communications circuitry originates a call connection to the fire department. The communications circuitry transmits an alphanumeric message over the call connection related to the detection and specific location of the fire. For example, the alphanumeric message could be a message such as smoke detected in room XYZ on floor B at address ABC. The communications circuitry could also send mass messaging to different locations such as the fire department, local police station, building owner, and hospital.

Alphanumeric Telephone

Figure 6:
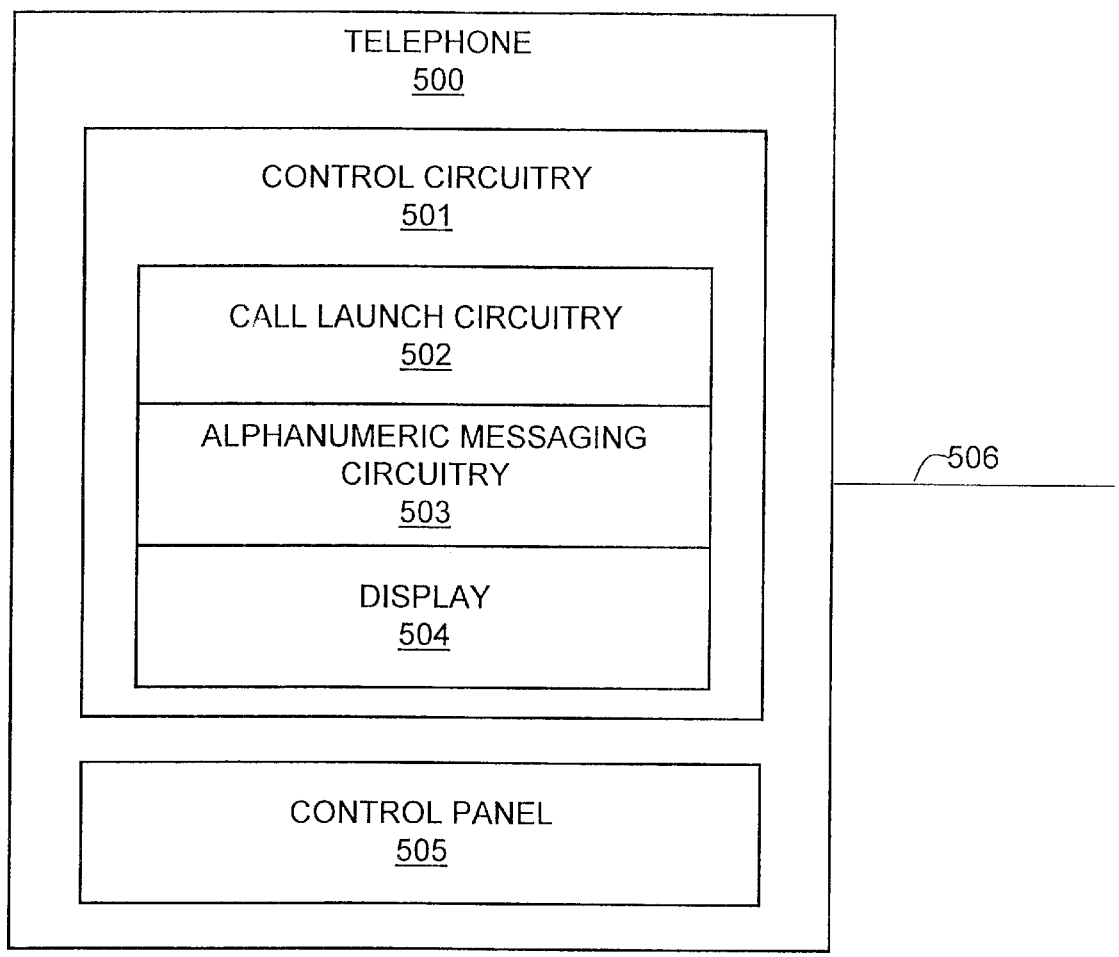
FIG. 6 illustrates an example of an alphanumeric telephone according to the present invention.

FIG. 6 is an example of an alphanumeric telephone according to the present invention. Alphanumeric telephone 500 is connected to the communications path 506 and comprises control circuitry 501, call launch circuitry 502, alphanumeric messaging circuitry 503, display 504, and control panel 505. Communications path 506 could be a conventional communications path capable of carrying digital and analog telephony signals. Communications path 506 could also be a wireless communications path or a wireline communications link. Telephone 500 could be a wireless telephone or a telephone connected to a wireline communications link.

Call launch circuitry 502 could be any circuitry configured to originate a voice telephony call connection over the communications path 506. The call connection could be to at least one other telephone, a communications circuitry according to the present invention, a computer system, or any other call device capable of receiving a voice telephony call and displaying alphanumeric messages. The at least one other telephone could be another alphanumeric telephone according to the present invention or could be any conventional telephone configured to display alphanumeric messages. Alphanumeric messaging circuitry 503 could be any circuitry configured to exchange alphanumeric messages over the voice telephony call connection. Control circuitry 501 could be any circuitry configured to control the call launch circuitry 502 to originate the voice telephony call connection and control the alphanumeric messaging circuitry 503 to exchange the alphanumeric messages over the call connection. Control circuitry 501 is also configured control display 505 to display received alphanumeric messages. Control circuitry 501 could also includes other operations as described in more detail below.

Control circuitry 501 operates in response to control signals from control panel 505. Control panel 505 receives instructions from a user and transmits control signals to control circuitry 505 to execute the instructions. For example, in response to receiving an alphanumeric message, a user could save the alphanumeric message on alphanumeric telephone 500. The message save operation could be performed manually by a programmed key on control panel 505 or could be performed automatically by control circuitry 501. The control circuitry 501 could save all incoming alphanumeric messages up to a specific limit. If the limit is reached, control circuitry 501 could replace the stored messages with new incoming messages starting with the oldest stored message.

Control circuitry 501 could also confirm receipt of an incoming alphanumeric message. The confirmation could be manual or automatic. For a manual confirmation, the user at the receiving alphanumeric telephone e.g. 500 enters a programmed key indicating the message was received and read prompting the receiving alphanumeric telephone e.g. 500 to send the confirmation. The confirmation could be an alphanumeric message displayed on the original senders display e.g. 504 or a signal to the original senders control circuitry e.g. 501. For an automatic confirmation the receiving alphanumeric telephone e.g. 500 could automatically send the confirmation when the message is received.

Control circuitry 501 could also include a distinctive alert that differentiates for a user between an incoming alphanumeric message and an incoming voice call on alphanumeric telephone 500. Examples of the distinctive alert include without limitation, a distinctive ring tone, a blinking indicator on alphanumeric telephone 500, or a display on display 504 indicating that an incoming alphanumeric message is being received.

Control circuitry 501 could also send an alphanumeric message over the call connection in response to receiving an incoming alphanumeric message. The response message could be a pre-programmed response message such as "yes, no, I will" that is sent by a programmed key on control panel 505. The response message could also be a message entered into control panel 505 by the user. The message could be entered using the dialing keys on alphanumeric telephone 500 or be entered using a conventional keypad on control panel 505.

In still yet another example, control circuitry 501 could originate a voice call from a received alphanumeric message. The voice call could be initiated in several ways including but not limited to pressing a single programmed key on control panel 505 or selecting from a menu of options displayed in response to receiving the alphanumeric message. The menu could include features such as the above described voice call feature, the above described message save features, the above described message confirmation features, the above described response message features, and the above described distinctive alert feature. The menu could also include sub-menus for features such as choosing an appropriate pre-programmed alphanumeric response message or changing the distinctive alert from a distinctive ring to the blinking indicator.

As will become clear from the following description, control circuitry 501 could also be used to provide a recorded message that indicates the incoming call is an alphanumeric message if the user picks up the receiver during an incoming alphanumeric message.

Those skilled in the art will appreciate that FIG. 6 is simplified for clarity, and some convention al components are omitted. Those skilled in the art will also understand that FIG. 6 is a logical view, and that the control circuitry 501 is implemented using processors, memory, software, control lines, and other circuitry.

Network Architecture

Figure 7:
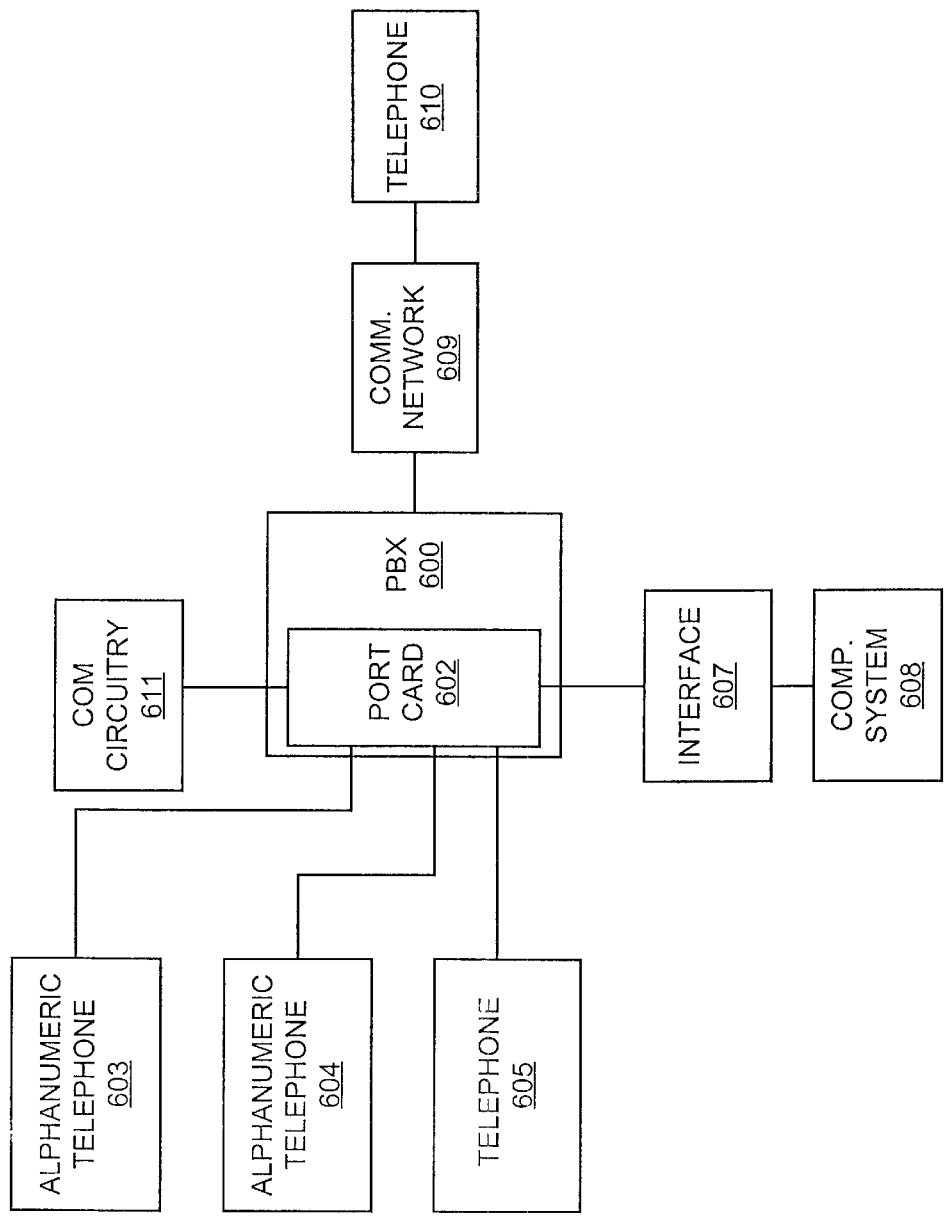
FIG. 7 illustrates a detailed example of an alphanumeric messaging system according to the present invention.

FIG. 7 depicts a detailed network architecture of an alphanumeric messaging system according to the present invention. FIG. 7 depicts communications circuitry 611, conventional telephones 605 and 610, alphanumeric telephones 603 and 604, PBX 600, interface 607, computer system 608, and communications network 609. PBX 600 includes PBX port card 602. Conventional telephones 605 and 610 could be any telephones configured to display alphanumeric messages. Telephones 603 and 604 are alphanumeric telephones according to the present invention.

Alphanumeric telephones 603 and 604, conventional telephone 605, and interface 607 are connected to port card 602. Port card 602 is a conventional PBX port card that could handle numerous such connections. Computer system 608 is a conventional computer system connected to interface 607. Interface 607 could be any interface configured to receive alphanumeric messages from computer system 608 for the PBX 600 and convert the alphanumeric messages to a voice call format for the PBX 600. One example of interface 607 is AT&T's adjunct switch application interface (ASAI) configured to provide computer control for PBX 600. Communications network 609 is connected to conventional telephone 610 and PBX 600. Communications network 609 could be any communications network configured to interface with PBX 600. In one example of the invention, alphanumeric telephones, 603 and 604, conventional telephone 605, communications circuitry 611, computer system 608, PBX 600, and interface 607 could be all be connected to a local area network, while communications network 609 is another network such as the public switched telephone network or the Internet.

In operation, alphanumeric telephone 603 can send alphanumeric messages over a call connection to one or all of alphanumeric telephone 604, conventional telephones 605 and 610, communications circuitry 611, and computer system 608. Alphanumeric telephone 604 can send alphanumeric messages over a call connection to one or all of alphanumeric telephone 603, conventional telephones 605 and 610, communications circuitry 611, and computer system 608. Communications circuitry 611 can send alphanumeric messages over a communications connection to one or all of alphanumeric telephones 603 and 604, conventional telephones 605 and 610, and computer system 608. Computer system 608 can send alphanumeric messages over a communications connection to one or all of alphanumeric telephones 603 and 604, conventional telephones 605 and 610, and communications circuitry 611. The communications connections can be wireless or wireline connections and could be a voice telephony call connection or a voice band data call connection or a data call connection. In an example of the invention, the alphanumeric messages could be provided between the above-described devices as user-to-user information (UUI). UUI comprises information of end-to-end significance sent over an ISDN data channel in the context of user-to-user (UUS) signaling. The UUS signaling falls into three categories. UUS1 provides for the transmission and reception of UUI during call set-up and termination, through ISDN user part (ISUP) control messages. UUS2 provides for the transmission and reception of UUI subsequent to call set-up, but prior to the establishment of a connection. UUS3 provides for the transmission and reception of UUI only while the call connection is established, such as during the active phase of circuit-switched calls. UUS1/2/3 messages typically comprise packets of 128 bytes.

The following are detailed examples to further illustrate the operation of the alphanumeric messaging system of the present invention, but those skilled in the art will recognize numerous other examples and configurations that are applicable to the invention described above.

In a first example, the communications circuitry 611 could be a stand alone device accessible by a patient in a hospital. Alphanumeric telephone 603 could be located at the nurse's station. The stimulus could be a programmed key that sends preprogrammed messages such as a request for a nurse, a food request, drink request, or medication request. Responsive to the patient entering the request, a nurse could either send a pre-programmed reply or enter an alphanumeric message into alphanumeric telephone 603. The alphanumeric message is received by communications circuitry 611 and displayed on a display e.g. 404.

In another example, a user at alphanumeric telephone 603 could use a programmed key a on control panel e.g. 505 to send a pre-programmed alphanumeric message to a user at alphanumeric telephone 604. If the user at alphanumeric telephone 604 picks up the receiver, PBX 600 could play a recorded message indicating that the incoming call is an alphanumeric message. In this case the conventional voice recording features of an empty socket on port card 602 is used to provide the voice recording to the user.

In yet another example, computer system 602 could be used to originate a voice call over PBX 600 to one or all of alphanumeric telephones 603 and 604, conventional telephones 605 and 610, or communications circuitry 611. Alphanumeric messages entered into computer system 608 are exchanged with those devices with response capability such as alphanumeric telephones 603 and 604. Alphanumeric messages entered into computer system 608 are transmitted to devices such as conventional telephones, 605 and 610, that can only receive and display alphanumeric messages.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An alphanumeric messaging system for providing alphanumeric messages over a communications connection, comprising:

a plurality of telephone station sets. each of which has an alphanumeric display that is capable of displaying alphanumeric call status messages, for providing voice communications over a communications connection;

a telephone switching system that serves said plurality of telephone station sets for establishing communications connections to said plurality of telephone station sets;

communications circuit means, served by said telephone switching system, for originating a communications connection to a selected one of said plurality of telephone station sets in response to a stimulus:

alphanumeric messaging means for transmitting an alphanumeric message over said communications connection to said telephone switching system; and wherein said telephone switching system is responsive to said communications circuit means originating said communications connection for activating said selected telephone station set to display said alphanumeric meaasge absent voice communications on said communications connection.

2. The alphanumeric messaging system of claim 1:

wherein said communications circuit means is configured to originate a plurality of communications connections with a plurality of telephone station sets; and wherein the alphanumeric messaging means is configured to provide the alphanumeric messages over the plurality of communications connections to the plurality of telephone station sets.

3. The alphanumeric messaging system of claim 1 further comprising:

an alphanumeric display means connected to said alphanumeric messaging means for displaying an incoming alphanumeric message; and message alert means for alerting a user when said alphanumeric display means receives said incoming alphanumeric message.

4. The alphanumeric messaging system of claim 3 further comprising:

response means for activating said alphanumeric messaging means to provide a response alphanumeric message over said communications connection in response to receiving said incoming alphanumeric message.

5. A method of operating an alphanumeric messaging system for providing alphanumeric messages over a communications connection, to selected ones of a plurality of telephone station sets, that provide voice communications over a communications connection, wherein a telephone switching system serves said plurality of telephone station sets for establishing communications connections to said plurality of telephone station sets, each of which has an alphanumeric display that is capable of displaying alphanumeric call status messages, comprising:

originating a communications connection with from a communications circuit served by said telephone switching system to selected one of said plurality of telephone station sets in response to a stimulus; and transmitting an alphanumeric message from said communications circuit over said communications connection to said telephone switching system; and wherein said telephone switching system is responsive to said communications circuit originating said communications connection for activating said selected telephone station set to display said alphanumeric message absent voice communications on said communications connection.

6. The method of claim 5, further comprising:

originating from said communications circuit a plurality of communications connections with a plurality of telephone station sets in response to receiving the stimulus; and transmitting the alphanumeric messages over the plurality of communications connections to the plurality of telephone station sets.

7. The method of claim 5, further comprising:

receiving an incoming alphanumeric message at said communications circuit;

displaying the incoming alphanumeric message on an alphanumeric display on said communications circuit; and alerting a user when said alphanumeric display receives said incoming alphanumeric message.

8. The method of claim 7 comprising:

transmitting a response message from said communications circuit over the communications connection in response to receiving the incoming alphanumeric message.

9. An alphanumeric messaging system for exchanging alphanumeric messages over a communications connection, the alphanumeric messaging system comprising:

a plurality of telephone station sets, each of which has an alphanumeric display that is capable of displaying alphanumeric call status messages, for providing voice communications over a communications connection;

a telephone switching system that serves said plurality of telephone station sets for establishing communications connections to said plurality of telephone station sets;

communications circuitry, served by said telephone switching system, configured to originate a communications connection to a selected one of said plurality of telephone station sets in response to receiving a stimulus;

alphanumeric messaging circuit for transmitting an alphanumeric message over said communications connection to said telephone switching system;

an alphanumeric telephone configured to originate an alphanumeric call connection and exchange the alphanumeric messages over the alphanumeric call connection: and wherein said telephone switching system is configured to establish the communications connection and the alphanumeric call connection and exchange the alphanumeric messages for the alphanumeric telephone and the communications circuitry.

10. The alphanumeric messaging system of claim 9 further comprising:

an interface coupled to the telephone switching system and configured to receive alphanumeric messages for the telephone switching system and convert the alphanumeric messages to a voice call format for the telephone switching system.

11. The alphanumeric messaging system of claim 9 wherein the communications circuitry and the alphanumeric telephone are connected to the telephone switching system by a local area network.

12. The alphanumeric messaging system of claim 9 further comprising:

a plurality of alphanumeric telephones connected to the telephone switching system, wherein the communications circuitry is configured to exchange the alphanumeric messages with the plurality of alphanumeric telephones.

* * * * *